Nov. 22, 1932.   E. BERGER   1,888,305
VERNIER SCALE GUARD MEASURING DEVICE
Filed Sept. 6, 1930
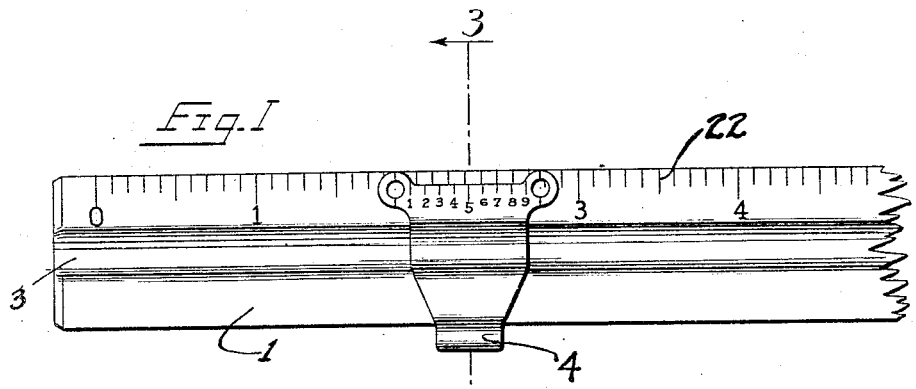
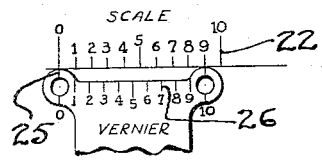
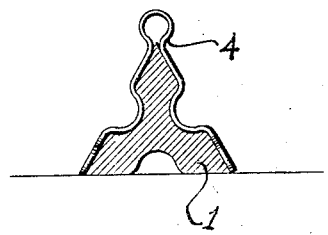
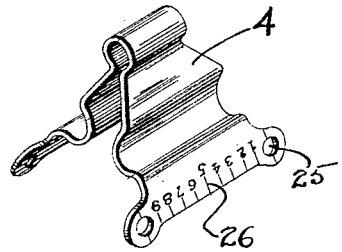
Emerick Berger.
INVENTOR.
BY
ATTORNEY Patented Nov. 22, 1932

1,888,305

UNITED STATES PATENT OFFICE

EMERICK BERGER, OF BRIDGEPORT, CONNECTICUT

VERNIER SCALE GUARD MEASURING DEVICE

Application filed September 6, 1930. Serial No. 480,051.

This invention relates to measuring rules or scales and to slidable guards to be used with the same as vernier measuring devices.

The object of this invention is to increase in a simple manner the rapidity and accuracy of measurements made from scales or rulers in drafting, tool making and other work of a similar exacting character.

The features of my vernier scale guard measuring device are its ease of readability and use and the readiness with which it lends itself to production in large quantities at a low cost.

This invention consists in supplying a scale rule or ruler with an adjustable shield or guard, by means of which all liability to the accidental use of a scale other than the particular one upon which the work is being measured is obviated, the shield or guard preferably carrying on its face a vernier and a measuring point locater which, when used in combination with said scale or rule, enables the user to rapidly find and closely and accurately fix required measurements. While the device in one of its forms applies to its use on a multisided rule having a series of different scales, it is equally applicable to scales or rules having but one measuring face and made of any material, or in any shape.

In the attached sheet of drawing:

Fig. 1 illustrates in plan view my improved vernier scale guard measuring device, in combination with a scale or rule, both said device and rule carrying lines of measurement.

Fig. 2 shows the relative arrangement of the measuring indices on the vernier and the scale.

Fig. 3 is a section taken along the lines 3—3 in Fig. 1.

Fig. 4 is an isometric view of my vernier scale guard measuring device showing the manner of constructing my preferred form, the type of material in preferred use and the position of the vernier indices with respect to the locating points or measuring point locators thereon.

In Fig. 1, numeral 1 represents a scale, rule or ruler carrying measuring indices shown at 22, and means in the form of groove 3 whereby my vernier scale guard measuring device 4 may slidably embrace said ruler 1 and engage in adjustable movement thereon.

In one sense my device may be considered as an improvement on the invention disclosed in the U. S. Letters Patent to Haslett, Number 146,673, although it is to be plainly understood in connection with my present invention that my device may take any other form within the scope of the claims appended hereto.

When the indices to be placed on my scale guard are initially laid out, the location point or measuring point locater 25 serves as the first index to commence the marking off of ten equal spaces corresponding in total distance to the distance occupied by nine spaces on the scale to which the vernier is to be applied. The openings 25 further provide a means whereby the indicia on the ruler may be observed. Such openings are necessary since the ears which extend to the edge of the ruler would otherwise cover the indicia. Such indexing, of course, is merely by way of illustrating the manner in which the vernier is laid out, similar practice being used in laying out verniers for scales other than the decimal or metric scale as shown.

When my vernier scale guard measuring device is in use, the line 0 indicated at the center of the location point 25 is moved only the distance required for any individual numeral or index line on the vernier 26 to correspond with the same index line or numeral on the scale 22.

If, for example, half of the distance between 0 and 1 on the scale is to be the next position of location point 0 or measuring point locater 25, the vernier scale guard measuring device 4 is moved to a point where the half way index 5 on the vernier corresponds by accurate alignment with half way index 5 on the scale 22.

After such an adjustment of vernier and scale, measuring point locater 25 or location point 0 will thus have been slidably positioned to bring the measuring point locater 25 quickly and accurately to a half way position between 0 and 1 on the scale index. Then measurement may be made at the measuring point o on the vernier.

As previously stated, the decimal or metric system of measurement is here used in the drawing on both vernier and scale merely to illustrate the principle of calibrating and operating my improved measuring device, it being understood that the same principle and similar practice may be applied with equal facility to any other form of measurement, say for example scales making use of eighths, sixteenths, thirty-seconds and sixty-fourths.

When the scale to which my vernier scale guard measuring device is fitted is either triangular or of any other cross sectional shape, it is preferable that the graduations on the scale and vernier be in substantially the same relative location with respect to each other as is shown in Fig. 1 on the accompanying drawing. It is also obvious that either scale or vernier scale guard measuring device may be made of metal, wood, moldable plastics or any other suitable material, or in any desired shape.

I therefore do not desire to limit myself to either the form or type of vernier scale guard or the form or type of scale, rule or ruler on which it is to be used.

I claim:

1. A vernier scale guard measuring device comprising a member adapted to slidably embrace a rule, one of the horizontal free edges of the member terminating inwardly of the adjacent measuring edge of the rule and provided with indices to form a vernier, and projecting ears at the respective corners of the aforesaid edge of said member, each ear being provided with an opening forming a measuring point locater, the outer edges of the ears lying substantially flush with the adjacent measuring edge of the rule.

2. A vernier scale guard measuring device comprising a member constructed to slidably embrace a triangular graduated ruler, one of the horizontal free edges of said member terminating inwardly of the adjacent measuring edge of the ruler, ears projecting from the respective corners of the aforesaid edge and the outer edges of said ears lying substantially flush with the adjacent edge of the ruler, each ear being provided with an opening forming a measuring point locater, said aforementioned horizontal edge of the member having indices arranged thereon.

Signed at Bridgeport in the county of Fairfield and State of Connecticut this 20th day of August A. D. 1930.

EMERICK BERGER.